United States Patent [19]

Toyota et al.

[11] 4,290,915

[45] Sep. 22, 1981

[54] SOLID TITANIUM CATALYST COMPOSITION FOR PRODUCTION OF AN OLEFIN POLYMER OR COPOLYMER

[75] Inventors: Akinori Toyota; Norio Kashiwa, both of Iwakuni, Japan

[73] Assignee: Mitsui Petrochemical Industries Ltd., Tokyo, Japan

[21] Appl. No.: 137,638

[22] Filed: Apr. 7, 1980

[30] Foreign Application Priority Data

Apr. 10, 1979 [JP] Japan ................................ 54-42494

[51] Int. Cl.³ ............................................ C08F 4/64
[52] U.S. Cl. ................................ 252/429 B; 526/125
[58] Field of Search ................................. 252/429 B

[56] References Cited

U.S. PATENT DOCUMENTS

| 4,069,169 | 1/1978 | Toyoda et al. | 252/429 B |
| 4,076,924 | 2/1978 | Toyota et al. | 252/429 B X |
| 4,111,835 | 9/1978 | Foschini et al. | 252/429 B X |
| 4,115,319 | 9/1978 | Scata et al. | 252/429 B |

FOREIGN PATENT DOCUMENTS

| 50/108385 | 7/1975 | Japan . |
| 50/20297 | 7/1975 | Japan . |
| 51/64586 | 4/1976 | Japan . |
| 51/92885 | 8/1976 | Japan . |
| 51/127185 | 11/1976 | Japan . |
| 51/136625 | 11/1976 | Japan . |
| 52/151691 | 5/1977 | Japan . |
| 52/87489 | 7/1977 | Japan . |
| 52/100596 | 8/1977 | Japan . |
| 52/10459 | 8/1977 | Japan . |
| 52/2580 | 12/1977 | Japan . |
| 52/147688 | 12/1977 | Japan . |
| 53/21093 | 2/1978 | Japan . |
| 53/30681 | 3/1978 | Japan . |
| 53/39991 | 3/1978 | Japan . |
| 53/40098 | 3/1978 | Japan . |

Primary Examiner—Patrick Garvin
Attorney, Agent, or Firm—Sherman & Shalloway

[57] ABSTRACT

A solid titanium catalyst component for the production of olefin polymers or copolymers, comprising titanium, magnesium, halogen and an electron donor as essential ingredients, said component further comprising an inert liquid hydrocarbon in an amount of, based on the weight of said component, of about 1 to about 10% when said component has a uniformity coefficient of at least 4, and about 1 to about 25% when said component has a uniformity coefficient of less than 4.

5 Claims, No Drawings

SOLID TITANIUM CATALYST COMPOSITION FOR PRODUCTION OF AN OLEFIN POLYMER OR COPOLYMER

This invention relates to an improved solid titanium catalyst component which exhibits superior performance with good reproducibility when used in producing an olefin polymer or copolymer (sometimes generically referred to as an olefin polymer in this application) having a high bulk density and high stereospecificity and a low content of an undesirable fine powdery polymer.

More specifically, this invention relates to a solid titanium catalyst component for the production of olefin polymers or copolymers, comprising titanium, magnesium, halogen and an electron donor as essential ingredients, said component further comprising about 1 to about 10%, based on the total weight of said component, of an inert liquid hydrocarbon.

It is well known, as disclosed in many publications to be exemplified hereinbelow, that a solid titanium catalyst component containing titanium, magnesium, halogen and an electron donor as essential ingredients, when combined with an organometallic compound of a metal of Groups I to III of the Mendeleejeff's periodic table, is useful in the homopolymerization or copolymerization of olefins, especially alpha-olefins having at least 3 carbon atoms; or the copolymerization of alpha-olefins having at least 3 carbon atoms and ethylene with or without diolefins to provide highly stereospecific polymers with high activity.

The bulk densities or stereospecificity indices of polymers obtained by polymerizing olefins with such catalysts by various polymerization methods such as solution polymerization, slurry polymerization or vapor-phase polymerization somewhat differ from each other, and the catalytic activities of such catalysts also differ from each other slightly. In many cases, the solid titanium catalyst component of high performance can be obtained by treating the resulting solid carrier with a titanium compound in the liquid phase in the final stage of preparation of the catalyst component.

According to the conventional practice, the solid titanium catalyst component so obtained is well washed with, for example, an inert liquid hydrocarbon, and stored as a slurry in the inert hydrocarbon or as a dried product until it is used for polymerization.

Noting that the performances of solid titanium catalyst components prepared from the same ingredients by the same means of preparation frequently differ considerably from batch to batch, the present inventors worked extensively to find the cause of difference.

Consequently, the present inventors have found that by drying the solid titanium catalyst component so that a specified amount of the aforesaid liquid inert hydrocarbon remains therein, the final solid titanium catalyst component containing the specified amount of the inert liquid hydrocarbon can afford an olefin polymer having a high bulk density, high stereospecificity and a reduced content of an undesirable fine powdery polymer, and that the reproducibility of such a performance of the catalyst component is good, and marked industrial improvements can be achieved.

This fact was unexpected because it was not known previously that the inert liquid hydrocarbon which the solid titanium catalyst component may contain constitutes a factor which exerts a significant effect on the aforesaid properties of the catalyst component.

It has also been found that the aforesaid improvements can be achieved by adjusting the amount of the inert liquid hydrocarbon to about 1 to about 10% based on the weight of the solid titanium catalyst component when the catalyst component has a uniformity coefficient of at least 4, and to about 1 to about 25% on the same basis when the catalyst component has a uniformity coefficient of less than 4; and that as shown in comparative tests given hereinbelow, if the titanium catalyst component is dried to an extent such that the amount of the hydrocarbon retained exceeds the aforesaid lower limit, stereospecificity is reduced, or when drying is omitted or is insufficient with the amount of the retained hydrocarbon exceeding the upper limit, the resulting polymer has a low bulk density and a large content of a fine powdery polymer.

It was quite unexpected that in spite of the fact that the aforesaid inert liquid hydrocarbon may be the same as the liquid hydrocarbon used in polymerization, the aforesaid improvements can be achieved by using the solid titanium catalyst component containing the hydrocarbon in the above-specified amount, and it is difficult to achieve these improvements when the amount of the hydrocarbon falls outside the specified range.

It is an object of this invention therefore to provide a solid titanium catalyst component for olefin polymerization, which can achieve the aforesaid improvements.

The above and other objects and advantages of this invention will become more apparent from the following description.

The solid titanium catalyst component of this invention for use in olefin polymerization contains titanium, magnesium, halogen and an electron donor as essential ingredients, and further comprises an inert liquid hydrocarbon in an amount, based on the weight of the titanium catalyst component, of about 1 to about 10% when the component has a uniformity coefficient of at least 4, and about 1 to about 25% when the component has uniformity coefficient of less than 4.

The amount of the inert liquid hydrocarbon in the titanium catalyst component of this invention is determined by gas chromatography after a predetermined amount of the titanium catalyst component is decomposed with a large amount of alcohol.

The uniformity coefficient of the titanium catalyst component in this invention is determined by the photo-extinction method. Photo-extinction method is described in Fine Particle Measurement, published by The Macmillan Company, New York, P 75.

The titanium catalyst component is diluted with a liquid hydrocarbon to a concentration of about 0.3 g/l. The resulting suspension is put into a measuring cell. Light from a slit is applied to the cell, and the intensity of the light which has been transmitted through the suspension is continuously measured while particles of the catalyst component are precipitating in the suspension. From the result, the particle size distribution of the catalyst component is determined. An integral curve of the particle size distribution is drawn by plotting the weight proportions on the ordinate and the particle diameters on the abscissa on the basis of the particle size distribution so determined. The uniformity coefficient of the titanium catalyst component is defined as the ratio of the particle diameter corresponding to a weight of 10%, to the particle diameter corresponding to a weight of 60% in the graph. Uniformity coefficient is described in Chemical Engineering, Oct. 13, 9 (1969).

The solid titanium catalyst component of this invention comprising titanium, magnesium, halggen and an electron door as essential ingredients can be obtained by selecting a magnesium compound with or without halogen, or magnesium metal, a titanium compound with or without halogen, and an electron donor such that the resulting titanium catalyst component contains halogen, and intimately contacting the selected ingredients by such a means as heating or co-pulverization. The halogen/titanium mole ratio of the resulting catalyst component preferably exceeds about 4, and the catalyst component does not substantially permit liberation of the titanium compound by such a simple means as washing with hexane. The exact chemical structure of the resulting catalyst component is not known, but it is presumed that the magnesium atom and the titanium atom are firmly bonded to each other having halogen in common. If desired, the solid titanium catalyst component may further comprise other metal atoms or elements such as aluminum, silicon, tin, boron, germanium, calcium, zinc and phosphorus, and functional groups. It may further include organic or inorganic inert solid diluents such as LiCl, $CaCC_3$, $BaCl_2$, $Na_2CO_3$, $SrCl_2$, $B_2O_3$, $Na_2SO_4$, $Al_2O_3$, $SiO_2$, $TiO_2$, $NaB_4O_7$, $Ca_3(PC_4)_2$, $CaSO_4$, $Al_2(SO_4)_3$, $CaCl_2$, $ZnCl_2$, polyethylene, polypropylene, and polystyrene.

Organic acid esters or ethers are preferred as the electron donor.

Advantageously, the solid titanium catalyst component of this invention has a halogen/titanium mole ratio of more than 4, preferably at least about 5, more preferably at least about 8, for example up to about 100, a magnesium/titanium mole ratio of at least about 3, preferably about 5 to about 50, an electron donor/titanium mole ratio of from about 0.2 to about 6, preferably from about 0.4 to about 3, more preferably from about 0.3 to about 2, and a specific surface area of at least about 3 $m^2/g$, preferably at least about 40 $m^2/g$, more preferably at least about 100 $m^2/g$. Desirably, the X-ray spectrum of the complex shows it to be amorphous irrespective of the type of the starting magnesium compound, or to be much more amorphous than commercially available magnesium dihalides.

Various means are known to form the solid titanium catalyst component which contains titanium, magnesium, halogen and an electron donor before controlling its inert liquid hydrocarbon content to the specified range, and any of such means can be used in this invention. Some of such methods for the preparation of the solid titanium catalyst component are disclosed, for example, in Japanese Laid-Open Patent Publications Nos. 108385/75 (corresponding to west German DOS No. 2,504,036), 126590/75 (corresponding to U.S. Pat. No. 4,069,169), 20297/76 (corresponding to west German DOS No. 2504036), 28189/76 (corresponding to U.S. Pat. No. 4,076,924), 64586/76, 92885/76, 127185/76, 136625/76, 8749/77 (corresponding to west German DOS No. 2,701,647), 100596/77), 10459/77 (corresponding to British Pat. No. 1,540,323), 147688/77 (corresponding to west German DOS No. 2,724,971), 151691/77 (corresponding to west German DOS No. 2,643,143), 2580/78 (corresponding to west German DOS No. 2,729,196), 21093/78 (corresponding to west German DOS No. 2,735,672), 30681/78 (corresponding to west German DOS No. 2,739,608), 39991/78(corresponding to west German DOS No. 2,743,415), and 40098/78 (corresponding to west German DOS No. 2,743,366).

Some specific embodiments of these means are described below.

(1) A magnesium compound, preferably a magnesium compound expressed by the formula $Mg(OR)_nX_{2-n}$ (in which R represents a hydrocarbon group, for example an alkyl group having 1 to 18 carbon atoms, a cycloalkyl group having 5 to 18 carbon atoms or an aryl group having 6 to 18 carbon atoms, n is a number represented by $0 \leq n \leq 2$, and X represents a halogen atom, preferably chlorine, bromine or iodine), especially preferably magnesium chloride, is reacted with an electron donor or an adduct of the electron donor with a halogen-containing aluminum compound (the halogen-containing titanium compound and the electron donor may form an adduct in advance, or the electron donor may form a complex with such a halogen-containing aluminum compound as an aluminum trihalide); or these compounds are strongly pulverized mechanically in the absence or presence of a small amount of a hydrocarbon, a silicon compound, an aluminum compound, an alcohol, a phenol, etc. The resulting reaction product or pulverized product, optionally treated further with a silicon compound, an organoaluminum compound, etc. with or without an alcohol, is then further reacted with a titanium halide, preferably titanium tetrachloride.

(2) A halogen-containing magnesium compound, preferably magnesium chloride, is reacted with an active hydrogen-containing electron donor such as alcohols or phenols and an electron donor free from active hydrogen such as an organic acid ester or an organic acid halide, then with an organoaluminum compound or a silicon halide, and further with a titanium compound, preferably titanium tetrachloride.

(3) The product obtained in embodiment (1) or (2) is reacted further with an electron donor and a titanium compound, preferably titanium tetrachloride.

(4) The product obtained in embodiment (1) or (2) is reacted further with an electron donor, a titanium compound, preferably titanium tetrachloride, and an organoaluminum compound.

(5) A compound containing an organic magnesium compound is treated with a compound having a functional group such as a hydroxyl, ester or carboxyl group or a halogen containing compound, and then treated with a titanium compound, preferably titanium tetrachloride, in the presence of an electron donor.

The solid titanium catalyst component that can be formed by known methods can be purified by washing it with an inert liquid hydrocarbon. The term "inert hydrocarbon", as used in this application denotes a hydrocarbon which does not markedly degrade the performance of catalyst. Examples of such a hydrocarbon include aliphatic hydrocarbons such as n-pentane, isopentane, n-hexane, isohexane, n-heptane, n-octane, iso-octane, n-decane, n-dodecane, kerosene, and liquid paraffin; alicyclic hydrocarbons such as cyclopentane, methylcyclopentane, cyclohexane and methylcyclohexane; and aromatic hydrocarbons such as benzene, toluene, xylene and cymene. These hydrocarbons may be used as a mixture of at least two.

In order to obtain a titanium catalyst component having a degree of uniformity of less than 4, it is preferred to use a method which comprises narrowing the particle size distribution of a magnesium compound, and then reacting such a magnesium compound with a titanium compound which is liquid under the reaction conditions, or a method which comprises reacting a liquid magnesium compound and a liquid titanium compound under conditions that particles having a narrow particle size distribution are precipitated. For example, such a solid titanium catalyst component can be prepared by the techniques disclosed in Japanese Laid-Open Patent Publications Nos. 38590/77, 146292/78 and 41985/79, and Japanese Patent Applications Nos. 43002/79, 43003/79 and 75582/79. Several examples of such techniques are described below briefly.

(1) An oxygen-containing magnesium compound, or a complex of a magnesium compound and an electron donor, having a particle diameter of about 1 to about 200 microns and a uniformity coefficient of less than about 4, optionally pre-treated with an electron donor and/or a reagent such as an organoaluminum compound or halogen-containing silicon compound, is reacted with a titanium halide which is liquid under the reaction conditions, preferably titanium tetrachloride.

(2) A magnesium compound in the liquid state having no reducing ability is reacted with a liquid titanium compound in the absence or presence of an electron donor to precipitata a titanium catalyst component having a particle diameter of about 1 to about 200 microns and a uniformity coefficient of less than about 4.

(3) The product obtained in (2) above is reacted with a titanium compound.

(4) The product obtained in (1) or (2) is reacted with an electron donor and a titanium compound.

(5) The product obtained in (1) or (2) is reacted with an electron donor, a titanium compound and an organoaluminum compound.

Examples of the magnesium compound used in the preparation of the titanium catalyst component having a uniformity coefficient of less than 4 include magnesium oxide, magnesium hydroxide, hydrotalcite, carboxylic acid salts of magnesium, alkoxymagnesiums, aryloxymagnesiums, alkoxymagnesium halides, aryloxymagnesium halides, magnesium dihalides, and the reaction products between organic magnesium compounds and silanols, siloxanes, halosilanes, etc.

The solid titanium catalyst component of this invention can be obtained, for example, by drying the wet component formed in the aforesaid manner by washing with an inert liquid hydrocarbon. When the aforesaid component has a uniformity coefficient of at least 4, the final product can be obtained by drying it such that the content of the inert liquid hydrocarbon is about 1 to about 10%, preferably about 1 to about 6%, based on the weight of the component.

If the aforesaid drying is omitted, or the drying resulted in a larger content of the inert liquid hydrocarbon than the specified upper limit, an olefin polymer obtained by, for example, slurry polymerization or vapor-phase polymerization, does not have an increased bulk density, and the amount of a fine powdery polymer increases, and moreover, the reproducibility of the quality of the resulting polymer is poor. By drying the resulting titanium catalyst component such that its content of inert liquid hydrocarbon is within the specified range, there can be obtained a solid titanium catalyst component, which when used in the polymerization of olefins, can give a polymer having an increased bulk density with a reducted amount of a fine powdery polymer and a good reproducibility of the quality of the resulting polymer. Furthermore, the loss of the polymer decreases in block copolymerization in propylene polymerization, and a polymer of high quality can be produced. Moreover, the catalyst component is easier to transport or store. When the drying is carried out such that the content of the inert liquid hydrocarbon decreases beyond the specified lower limit, the stereospecificity index of an olefin polymer obtained by the stereospecific polymerization of olefin using the resulting titanium catalyst component is reduced.

The solid titanium catalyst component of this invention may be stored as such, preferably in an inert atmosphere, such as a nitrogen atmosphere, until it is used for polymerization. If desired, it may be again suspended in an inert liquid hydrocarbon and stored in this state. When it is stored for an excessively long period of time, the effect of drying may be lost. Accordingly, it should be used for polymerization as early as possible, even when it is stored as suspended in an inert liquid hydrocarbon. For example, when the titanium catalyst component has been dried to such an extent that its content of the hydrocarbon is about 1 to about 6%, its performance does not change for about 10 days at room temperature. When the drying is done to such an extent that the content of the hydrocarbon is about 6 to about 10%, the performance of the resulting catalyst component begins to decrease when it is maintained at room temperature for about 2 days. In such a case, the catalyst component may be again suspended in the inert liquid hydrocarbon and again dried to adjust its content to the specified range, before it is used for polymerization.

When the uniformity coefficient of the aforesaid catalyst component is less than 4, it is dried until the amount of the liquid hydrocarbon reaches about 1 to about 25%, preferably about 1 to about 20%, based on the weight of the component. When no drying is done, or the drying is insufficient so that the amount of the liquid hydrocarbon exceeds the specified upper limit, the catalyst particles are liable to undergo agglomeration during transportation or storage, and are difficult to discharge from a catalyst reservoir. By drying the catalyst component to the specified extent, it can be more easily transported or stored.

The drying treatment is carried out preferably under relatively mild temperature conditions. For example, it is carried out at a temperature of not more than about 80° C., preferably about 0° C. to about 60° C., in an atmosphere of an inert gas. Temperatures in excess of about 80° C. tend to cause a reduction in polymerization activity in contrast to the case of performing the drying treatment at temperatures lower than about 80° C. Accordingly, drying at temperatures lower than about 80° is preferred. On the other hand, too low a drying temperature, for example temperatures below about 0° C., is not practical because it will prolong the treating time to no advantage.

The drying time depends upon various operating conditions such as temperature. Drying is carried out until the content of the inert liquid hydrocarbon in the solid titanium catalyst component reaches the values within the specified range. Generally, the drying time is from about 15 minutes to about 100 hours, preferably from about 30 minutes to about 48 hours. The pressure maintained during the drying of the solid titanium catalyst component is not critical so long as it is lower than the saturated pressure of the liquid held in the catalyst component. For example, the drying can be carried out at atmospheric pressure or reduced pressure. If the drying temperature is as low as room temperature, it is advantageous to perform the drying under reduced pressure so as to promote removal of the inert liquid medium.

Drying of the solid titanium catalyst component may be carried out in an atmosphere of an inert gas. The use of nitrogen is preferred for this purpose.

Drying of the solid titanium catalyst component in this invention may be carried out in an apparatus having a specification suitable for the operation, for example a moving bed dryer such as a horizontal stirred dryer, a rotary drum-type dryer or a vertical stirred dryer. A fixed bed dryer through which an inert gas flows may also be used, but the moving bed-type is advantageous because the drying time is shorter. Advantageously, the solid titanium catalyst component to be subjected to the drying step is moderately deprived of the inert liquid hydrocarbon before the drying treatment. Filtration, centrifugation, precipitating separation using a siphon, etc. may be used to remove the hydrocarbon prior to the drying treatment.

The halogen which constitutes the solid titanium catalyst component of this invention is fluorine, chlorine, bromine, iodine or mixtures thereof. Chlorine is preferred.

The electron donor used in the production of the solid titanium catalyst component includes, for example, oxygen-containing electron donors such as alcohols, phenols, ketones, aldehydes, carboxylic acids, organic or inorganic acid esters, ethers, acid amides and acid anhydrides, and nitrogen-containing electron donors such as ammonia, amines, nitriles and isocyanates.

Specific examples of these electron donors are alcohols having 1 to 18 carbon atoms such as methanol, ethanol, propanol, pentanol, hexanol, octanol, dodecanol, octadecyl alcohol, benzyl alcohol, phenethyl alcohol, cumyl alcohol and isopropyl benzyl alcohol; phenols having 6 to 15 carbon atoms and optionally containing a lower alkyl group, such as phenol, cresol, xylenol, ethylphenol, propylphenol cumylphenol and naphthol; ketones having 3 to 15 carbon atoms such as acetone; methyl ethyl ketone, methyl isobutyl ketone, acetophenone and benzophenone; aldehydes having 2 to 15 carbon atoms such as acetaldehyde, benzaldehyde, tolualdehyde and naphthoaldehyde; organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarine, phthalide and ethylene carbonate; inorganic acid esters such as ethyl silicate and ethylethoxysilane; acid halides such as acetyl chloride, benzyl chloride, toluoyl chloride and anisoyl chloride; ethers having 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; amines such as methylamine, ethylamine, diethylamine, tributylamine, piperidine, tribenzylamine, aniline, pyridine, picoline and tetramethyl ethylene diamine; and nitriles such as acetonitrile, benzonitrile and tolunitrile. Two or more of these electron donors may be used in combination.

Preferred electron donors to be included in the titanium catalyst component as an essential ingredient are those not having active hydrogen, such as organic or inorganic acid esters, ethers, ketones, tertiary amines, acid halides and acid anhydrides. The organic acid esters and ethers are especially preferred. Of these, aromatic carboxylic acid esters, and alkyl-containing ethers are most preferred. Typical examples of the preferred aromatic carboxylic acid esters include aromatic carboxylic acid esters having 8 to 18 carbon atoms, especially lower alkyl or alkoxy esters of benzoic acid, lower alkyl benzoic acids and lower alkoxybenzoic acids. Preferably, these lower alkyl or alkoxy esters have 1 to 4 carbon atoms, especially 1 or 2 carbon atoms. Suitable alkyl-containing ethers are those having 4 to 20 carbon atoms such as diisoamyl ether and dibutyl ether.

The solid titanium catalyst component for olefin polymerization in accordance with this invention can be advantageously utilized for polymerization of olefins when combined with organometallic compounds of metals of Groups I to III of the periodic table, especially organoaluminum compounds.

Organoaluminum compounds containing one Al carbon bond at least in the molecule. Examples are (i) organoaluminum compounds of the general formula $R^1_m Al(OR^2)_n H_p X_q$ (wherein each of $R^1$ and $R^2$ represents a hydrocarbon group having 1 to 15 carbon atoms, preferably 1 to 4 carbon atoms, for example, an alkyl, cycloalkyl or aryl group and may be identical or different, X represents halogen, m is a number represented by $0 < m \leq 3$, n is a number represented by $0 < n \leq 3$, p is a number represented by $0 < p \leq 3$, and q is a number represented by $0 < q \leq 3$, with the proviso that $m+n+p+q=3$); and (ii) complex alkylated products of metals of Group I and aluminum, as represented by the general formula $M^1 AlR^1_4$ (wherein $M^1$ represents Li, Na or K, and $R^1$ is as defined above).

Examples of the organoaluminum compounds that fall within the category (i) include those of the general formula $R^1_m Al(OR^2)_{3-m}$ wherein $R^1$ and $R^2$ are as defined above, and m is preferably a number represented by $1.5 \leq m \leq 3$; those of the general formula $R^1_m AlX_{3-m}$ wherein $R^1$ is as defined above and X is halogen, and m is preferably $0 < m < 3$; those of the general formula $R^1_m AlH_{3-m}$ wherein $R^1$ is as defined above, and m is a number preferably a number represented by $2 \leq m < 3$; and those of the general formula $R^1_m Al(OR^2)_n X_q$ wherein $R^1$ and $R^2$ are as defined above, X is halogen, $0 < m \leq 3$, $0 \leq n < 3$, $0 \leq q < 3$, and $m+n+q=3$.

Specific examples of the aluminum compounds (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquiethoxide and butyl aluminum sesquibutoxide; partially alkoxylated alkyl aluminums having an average composition $R^1_{2.5}Al(OR^2)_{0.5}$; partially halogenated alkyl aluminums, for example, dialkyl aluminum halogenides such as diethyl aluminum chloride, dibutyl aluminum chloride and diethyl aluminum bromide, alkyl aluminum sesquihalogenides such as ethyl aluminum sesquichloride, butyl aluminum sesquichloride and ethyl aluminum sesquibromide, and alkyl aluminum dihalogenides such as ethyl aluminum dichloride, propyl aluminum dichloride and butyl aluminum bromide; partially hydrogenated alkyl aluminums, for example dialkyl aluminum hydrides such as diethyl aluminum hydride and butyl aluminum hydride, and alkyl aluminum dihydrides such as ethyl aluminum dihydride and propyl aluminum dihydride; and partially alkoxylated and halogenated alkyl aluminums such as ethyl aluminum ethoxy chloride, butyl aluminum butoxy chloride and ethyl aluminum ethoxybromide. Organoaluminum compounds in which two or more aluminum atoms are bonded through an oxygen or nitrogen atom, which are similar to the compounds (i), may also be used. Examples of these compounds are $(C_2H_5)_2AlOAl(C_2H_5)$, $(C_4H_9)_2AlOAl(C_4H_9)_2$, and $(C_2H_5)_2AlNAl(C_2H_5)_2$.

Examples of the compounds that fall within the category (ii) are $LiAl(C_2H_5)_4$ and $LiAl(C_7H_{15})_4$.

Among the above compounds, trialkyl aluminums and mixtures of trialkyl aluminums and alkyl aluminum halides are preferred.

The solid titanium catalyst component containing an inert liquid hydrocarbon in accordance with this invention can be used advantageously in the polymerization or copolymerization of olefins. For example, the olefins are those having 2 to 8 carbon atoms such as ethylene, propylene, 1-butene, 4-methyl-1-pentene and 1-octene. These olefins may be subjected not only to homopolymerization, but also to random copolymerization or block copolymerization. In the copolymerization, polysaturated compounds such as conjugated or non-conjugated dienes may be selected as comonomers. Particularly, by utilizing the catalyst component of this invention in the polymerization or copolymerization of alpha-olefins having at least 3 carbon atoms, the copolymerization of these with dienes, or copolymerization of these with not more than 10 mole% of ethylene, polymers having high stereospecificity can be obtained in high yields with good reproducibility.

The polymerization can be performed either in the liquid phase or in the vapor phase. When it is carried out in the liquid phase, an inert liquid hydrocarbon solvent such as hexane, heptane and kerosene may be used as a reaction medium, but the olefin itself may be used as a reaction medium. In the liquid-phase polymerization it is preferred to use the solid titanium catalyst component of this invention in an amount of about 0.0001 to about 1 millimole, calculated as titanium atom, and an organoaluminum compound in an amount of about 0.1 to about 50 millimoles, calculated as aluminum atom, both per liter of liquid phase, and to adjust the aluminum/titanium atomic ratio to about 1:1 to about 1000:1. A molecular weight controlling agent such as hydrogen may be used in the polymerization process. To control the stereospecificity of alpha-olefins having at least 3 carbon atoms, the polymerization may also be carried out in the co-presence of an ethylene glycol derivative (e.g., ethylene glycol monomethyl ether), an ether, an amine, a sulfur-containing compound, a nitrile, an organic or inorganic ester, an acid anhydride, an alcohol, etc. The presence of an aromatic carboxylic acid ester such as a benzoate, p-toluate or anisate as exemplified hereinabove with regard to the preparation of the titanium catalyst component is preferred. These compounds may be used in the form of an adduct with the organoaluminum compound. The effective amount of the aforesaid additional compound is usually about 0.01 to about 2 moles, preferably about 0.1 to about 1 mole, per mole of the organoaluminum compound.

The polymerization temperature for olefins is preferably about 20° C. to about 200° C., more preferably about 50° C. to about 180° C. The reaction pressure is from atmospheric pressure to about 50 kg/cm$^2$, preferably an elevated pressure of from about 2 to about 20 kg/cm$^2$. The polymerization can be carried out in any of batchwise, semi-continuous and continuous modes. The polymerization may, if desired, be carried out in two or more stages in which the reaction conditions and/or the reaction zones are different.

The solid titanium catalyst component of this invention is especially suitable for the production of highly stereospecific polymers of high bulk densities in high yields from alpha-olefins having at least 3 carbon atoms. Since the amount of a fine powdery polymer formed is small, the solid catalyst component can be used with commercial advantage.

The following examples illustrate the present invention in more detail.

EXAMPLE 1

Preparation of a Ti-containing catalyst component:

Under a nitrogen atmosphere, 20 g of MgCl$_2$, 5.25 g of ethyl benzoate and 3 ml of dimethylpolysiloxane (viscosity 20 c.s.) were fed into a stainless steel (SUS-32) ball mill vessel having an inside diameter of 100 mm and containing 2.8 kg of stainless steel (SUS-32) balls each having a diameter of 15 mm, and were contacted under mechanically pulverizing conditions for 24 hours at an acceleration of impact of 7G. Fifteen (15) grams of the resulting pulverized product was suspended in 150 ml of titanium tetrachloride, and contacted at 80° for 2 hours with stirring. The solid portion was collected by filtration. Furthermore, 150 ml of titanium tetrachloride was added to the solid portion on the filter, and they were stirred at 80° C. for 1 hour. The mixture was filtered, and thoroughly washed with fresh hexane. The resulting Ti-containing catalyst component had an average particle diameter of 14 microns, and a uniformity coefficient of 4.55.

Drying of the Ti-containing catalyst component:

A suspension of 10 g of the resulting Ti-containing catalyst component in 30 ml of hexane as an inert liquid hydrocarbon was taken into a 300 ml. flask which had been purged fully with nitrogen. The flask was dipped in an oil bath maintained at 80° C., and a stream of N$_2$ was passed through it for 5 hours to dry the titanium catalyst component. The resulting solid titanium catalyst component contained 1.7% by weight of Ti; 64.5% by weight of Cl, 20.6% by weight of Mg, 7.1% by weight of ethyl benzoate, and 4.8% by weight of hexane.

Polymerization:

A 2-liter autoclave was charged with 0.75 liter of hexane, and the inside of the autoclave was fully purged with propylene. The inside of the autoclave was heated to 55° C., and then 3.75 millimoles of triethyl aluminum, 1.25 millimoles of methyl toluate and 0.0225 mg-atom, calculated at Ti atom, of the resulting Ti catalyst component were added. H$_2$ was added in an amount of 300 N ml, and immediately then, the temperature of the polymerization system was raised. Propylene was polymerized therein at 70° C. for 4 hours while maintaining the pressure at 7 kg/cm$^2$·G. After the polymerization, the solid portion was collected by filtration. There was obtained 237.8 g of white powdery polypropylene having a boiling n-heptane extraction residue of 96.2%, a melt flow index (MI) of 4.6 g/10 min. and an apparent density of 0.33 g/ml. There was obtained 14.4% by weight of a fine powdery polymer having a particle diameter of less than 105 microns. Concentrating the liquid phase afforded 8.6 g of a solvent-soluble polymer.

COMPARATIVE EXAMPLE 1

Propylene was polymerized under the same conditions as in Example 1 except that the titanium catalyst component obtained in Example 1 was used as a hexane suspension without subjecting it to the drying step. There was obtained 173.7 g of a white powdery polymer having a boiling n-heptane extraction residue of 97.0%, a melt flow index of 3.0. and an apparent density of 0.20 g/ml. There was obtained 25.5% by weight of a fine powdery polymer having a particle diameter of less than 105 microns. Concentrating the liquid phase afforded 5.5 g of a solvent-soluble polymer.

COMPARATIVE EXAMPLE 2

Propylene was polymerized under the same conditions as in Example 1 except that the titanium catalyst component obtained in Example 1 was dried under a stream of nitrogen gas at 40° C. for 2 hours to a hexane content of 12.5% by weight prior to use in the polymerization. There was obtained 266.2 g of a white powdery polymer having a boiling n-heptane extraction residue of 95.2% by weight, a melt flow index of 6.2 and an apparent density of 0.27 g/ml. There was obtained 19.5% by weight of a fine powdery polymer having a particle diameter of less than 105 microns. Concentrating the liquid phase afforded 9.8 g of a solvent-soluble polymer.

COMPARATIVE EXAMPLE 3

The titanium catalyst component obtained in Example 1 was washed with hexane, and then dried at 2 mmHg for 3 hours. The hexane content of the dried product was 0.1% by weight.

Polymerization:

Propylene was polymerized under the polymerization conditions shown in Example 1 using the resulting titanium catalyst component. There was obtained 225.8 g of a white powdery polymer having a boiling n-heptane extraction residue of 94.1%, an apparent density of 0.36 g/ml and a melt flow index of 5.3. There was obtained 10.6% by weight of a fine powdery polymer having a particle diameter of less than 105 microns. Concentrating the solvent layer afforded 12.7 g of a solvent-soluble polymer.

EXAMPLE 2

The same titanium catalyst component as obtained in Example 1 was dried first at 70° C. for 30 minutes until it became a mud, and then the mud was maintained at 50° C. for 1.5 hours. The resulting catalyst component was found to contain 4.2% of hexane.

Propylene was polymerized under the same conditions as in Example 1 using the resulting catalyst component.

The results are shown in Table 1.

EXAMPLE 3

A titanium catalyst component was prepared in the same way as in Example 1 except that 8.6 g of ethyl o-toluate was used instead of 5.25 g of ethyl benzoate, and dimethylpolysiloxane was not used. The resulting titanium catalyst component had an average particle diameter of 13.5 microns and a uniformity coefficient of 4.6.

Drying:

A mixture of 7 g of hexane and 11 g of the resulting solid titanium catalyst component was dried at 25° C. for 30 minutes under a pressure of 10 mmHg. The resulting solid contained 1.9% by weight of Ti, 18.0% by weight of Mg, 60.0% by weight of Cl, 8.5% by weight of ethyl benzoate and 3.1% by weight of hexane.

Polymerization:

Propylene was polymerized under the same conditions as in Example 1. The results are shown in Table 1.

TABLE 1

| Example | Amount of a white powdery polymer (g) | Boiling n-heptane residue (%) | Apparent density (g/ml) | MI (g/10 min.) | Amount of a fine powdery polymer with a size of less than 105 microns (wt. %) | Amount of a solvent-soluble polymer (g) |
|---|---|---|---|---|---|---|
| 2 | 215.7 | 95.2 | 0.35 | 6.9 | 14.3 | 8.2 |
| 3 | 279.2 | 94.1 | 0.36 | 4.4 | 11.5 | 12.8 |

EXAMPLE 4

Preparation of a titanium catalyst component:

Anhydrous magnesium chloride (4.79 g), 25 ml of n-decane and 18.3 ml of 2-ethyl hexanol were heat-treated at 130° C. for 2 hours to form a uniform solution. Then, 0.84 ml of ethyl benzoate was added. The solution was added dropwise with stirring over 20 minutes to 200 ml of titanium tetrachloride cooled at 0° C. The temperature was gradually raised, and then 1.39 ml of ethyl benzoate was added at 80° C. The mixture was stirred at 80° C. for 2 hours. The solid portion was collected by filtration, and again suspended in 100 ml of titanium tetrachloride. The suspension was heated at 90° C. for 2 hours, and then the solid was collected by filtration. The solid was thoroughly washed with purified hexane until no free titanium compound was detected in the washing.

The resulting titanium catalyst component contained 3.4% by weight of Ti, 20.0% by weight of Mg, 59.0% by weight of Cl and 16.6% by weight of ethyl benzoate, and had a spherical particle shape, an average particle diameter of 5 microns, and a uniformity coefficient of 1.34.

Drying of the titanium catalyst component:

A suspension of 3 g of the titanium catalyst component in 30 ml of hexane was fed into a 300 ml flask fully purged with nitrogen, and then maintained at 25° C. The flask was dipped in a bath, and nitrogen was passed through it for 50 minutes. The resulting dry titanium catalyst component was a solid powder having good flowability. By analysis, the solid was found to contain 16.6% by weight of hexane.

Polymerization:

A 2-liter autoclave was charged with 0.75 liter of hexane, and the inside of the autoclave was purged fully with propylene. The polymerization system was heated to 68° C., and 0.50 millimole of triethyl aluminum, 0.25 millimole of ethyl aluminum sesquichloride, 0.15 millimole of methyl toluate, and 0.015 mg-atom, calculated as Ti atom, of the resulting titanium catalyst component were fed into the autoclave. H$_2$ was introduced in an amount of 400 ml, and propylene was charged into it continuously. Propylene was polymerized at 70° C. for 2 hours while maintaining the pressure at 7 kg/cm$^2$.G. After the polymerization, the solid component was collected by filtration. There was obtained 197.0 g of white powdery polypropylene having a boiling n-heptane extraction residue of 97.4%, a melt flow index of 4.1 and an apparent density of 0.38 g/ml. The polymer was in the form of spherical particles having an average particle diameter of 120 microns and a uniformity coefficient of 1.4. Concentrating the liquid phase afforded 1.7 g of a solvent-soluble polymer.

EXAMPLE 5

In the preparation of the titanium catalyst component in Example 4, the drying was performed at 50° C. for 15 minutes to afford a solid titanium catalyst component having a hexane content of 11.6% by weight.

Polymerization:

Propylene was polymerized under the same conditions as in Example 4. The results are shown in Table 2.

EXAMPLE 6

In the preparation of the titanium catalyst component in Example 4, heptane was used instead of the hexane, and drying was performed at 30° C. for 4 hours under a stream of N$_2$. By analysis, the solid catalyst component was found to have a heptane content of 18.6% by weight.

Polymerization:

Propylene was polymerized under the same conditions as in Example 4. The results are shown in Table 2.

EXAMPLE 7

Synthesis of spherical MgCl$_2$.nEtOH:

A 3-liter autoclave, fully purged with N$_2$, was charged with 1.5 liters of purified kerosene, 112.5 g of commercially available MgCl$_2$, 163 g of ethanol and 5 g of Emasol 320 (a trademark for surfactants made by Kao-Atlas Co., Ltd.). The mixture was heated with stirring, and stirred at 125° C. and 600 rpm for 20 minutes. The pressure of the inside of the autoclave was adjusted to 10 kg/cm$^2$.G with N$_2$. A cock of a stainless steel tube having an inside diameter of 3 mm directly connected to the autoclave and maintained at 125° C. was opened to transfer the mixture in the autoclave to a 5-liter glass flask (equipped with a stirrer) charged with 3 liters of purified kerosene cooled to −15° C. The amount of the mixture transferred was liter, and the time required for the transfer was about 20 seconds. The resulting solid was collected by decantation, and washed thoroughly with hexane to afford a carrier. Microscopic examination showed that the carrier was in the form of completely spherical particles.

Preparation of a Ti-containing catalyst component:

A 300 ml glass flask was charged with 150 ml of TiCl$_4$, and 7.5 g of the solid obtained as described in the foregoing section suspended in 15 ml of purified kerosene was added with stirring at 20° C. Then, 1.83 ml of ethyl benzoate was added, and the mixture was heated to 100° C. The mixture was stirred at 100° C. for 2 hours, and then the stirring was stopped. The supernatant liquid was removed by decantation, and further 150 ml of TiCl$_4$ was added. The mixture was stirred at 110° C. for 2 hours. The solid portion was collected by hot filtration, and washed thoroughly with hot kerosene and hexane. The resulting titanium containing catalyst component containing 4.4/ by weight of Ti, 59.0% by weight of Cl, 19.0% by weight of Mg and 13.0% by weight of ethyl benzoate as atoms. The catalyst component was in the form of spherical particles having a specific surface area of 207 m$^2$/g, an average particle diameter of 13 microns, and a uniformity coefficient of 2.75.

Drying of the titanium catalyst component:

A suspension of 3 g of the catalyst component in 30 liters of hexane was taken into a 300 ml flask fully purged with nitrogen. The flask was placed in a bath kept at 25° C., and a stream of nitrogen was passed through it for 30 minutes. The resulting titanium catalyst component was a solid powder having good flowability. By analysis, it was found to have a hexane content of 20.6%.

Polymerization:

A 2-liter autoclave was charged with 0.75 liter of hexane, and the inside of the autoclave was fully purged with propylene. Then, 3.75 millimoles of triisobutyl aluminum, 1.75 millimoles of ethyl anisate, and 0.0225 millimole calculated as Ti atom of the above catalyst component were fed into the autoclave. H$_2$ was introduced in an amount of 400 ml, and the polymerization system was heated to 60° C. propylene was fed into the autoclave to maintain the pressure at 7 kg/cm$^2$.G, and polymerized at 60° C. for 2 hours. After the polymerization, the slurry was filtered to afford 215.9 g of a white powdery polymer having a boiling n-heptane extraction residue of 96.5%, an apparent density of 0.42 g/ml and a melt flow index of 4.8. The polymer was in the form of spherical particles having an average particle diameter of 330 microns and a uniformity coefficient of 2.75. Concentrating the solvent layer afforded 4.6 g of a solvent-soluble polymer.

COMPARATIVE EXAMPLE 4

The titanium catalyst component before drying which was obtained in Example 7 was dried in the same way as in Example 7 except that the drying time was changed to 4 hours. The resulting catalyst component had a hexane content of 0.3%.

Polymerization:

Propylene was polymerized under the same polymerization conditions as in Example 7. The results are shown in Table 2.

EXAMPLE 8

Tetraethoxysilane (0.11 mole) was added dropwise at room temperature to 0.1 mole of commercially available n-butyl magnesium chloride (n-butyl ether solvent). The mixture was stirred at 60° C. for 1 hour. The resulting solid was collected by filtration, and washed fully with hexane. The solid was suspended in 30 ml of kerosene, and 0.02 mole of ethyl benzoate was added dropwise and treated at 60° C. for 1 hour. The temperature was lowered, and 200 ml of TiCl$_4$ was added. The mixture was treated with stirring at 100° C. for 2 hours. The supernatant liquid was removed by decantation. Then, 200 ml of TiCl$_4$ was further added, and the residue was treated at 100° C. for 1 hour. The resulting solid was collected by hot filtration, and washed thoroughly with hot kerosene and hexane. The resulting titanium catalyst component contained 2.4% by weight of Ti, 62.0% by weight of Cl, 21.0% by weight of Mg and 7.4% by weight of ethyl benzoate as atoms. The catalyst component was in the form of granules having an average particle diameter of 12 microns and a uniformity coefficient of 2.7.

Drying:

A suspension of 3 g of the titanium catalyst component in 30 ml of hexane was taken into a 300 ml flask fully purged with nitrogen. The flask was dipped in a bath maintained at 30° C., and nitrogen was passed through it at 30° C. for 90 minutes. The dried solid catalyst component had good flowability and contained 18.9% by weight of hexane.

Polymerization:

Propylene was polymerized under the same conditions as in Example 7 using the catalyst component prepared as above. The results are shown in Table 2.

COMPARATIVE EXAMPLE 5

The drying treatment in Example 8 was performed at 20° C. under reduced pressure for 4 hours. The resulting dry solid contained 0.2% by weight of hexane.

Propylene was polymerized under the same conditions as in Example 7 using the resulting dry solid catalyst component. The results are shown in Table 2.

uid hydrocarbon is present in an amount of, based on the weight of said component, about 1 to about 10% when said component has a uniformity coefficient of at least 4, and about 1 to about 25% when said component has a uniformity coefficient of less than 4.

2. The solid titanium catalyst component of claim 1 wherein said content of the inert liquid hydrocarbon is attained by subjecting a solid titanium catalyst component containing said inert liquid hydrocarbon to a drying treatment.

3. The solid titanium catalyst component of claim 1 wherein said content of the inert liquid hydrocarbon is about 1 to about 6% by weight based on the weight of said solid titanium catalyst component.

4. The solid titanium catalyst component of claim 1 wherein the halogen/titanium mole ratio is more than about 4, the magnesium/titanium mole ratio is not less than about 3, and the electron donor/titanium mole ratio is from about 0.2 to about 6.

TABLE 2

| Example (Ex.) or Comparative Example (CEx.) | Amount of a white powdery polymer (g) | Boiling n-heptane extraction residue (%) | Apparent density (g/ml) | MI | Amount of a solvent-soluble polymer (g) | Average particle diameter (microns) | Uniformity coefficient | Shape of polymer |
|---|---|---|---|---|---|---|---|---|
| Ex. 5 | 178.3 | 97.3 | 0.37 | 3.7 | 1.7 | 115 | 1.4 | Spherical |
| Ex. 6 | 187.6 | 97.3 | 0.37 | 5.2 | 1.4 | 120 | 1.4 | |
| Ex. 8 | 198.7 | 94.2 | 0.41 | 6.3 | 6.1 | 300 | 2.3 | Granular |
| CEx. 4 | 155.0 | 95.5 | 0.40 | 5.9 | 2.5 | — | — | |
| CEx. 5 | 144.9 | 94.0 | 0.41 | 6.6 | 5.9 | — | — | |

What we claim is:

1. In a solid titanium catalyst component for the production of olefin polymers or copolymers, comprising titanium, magnesium, halogen and an electron donor as essential ingredients and further containing an inert liquid hydrocarbon, the improvement wherein the liq- 5. The solid titanium catalyst component of claim 1 wherein said inert liquid hydrocarbon is a member selected from the group consisting of aliphatic hydrocarbons, alicyclic hydrocarbons, aromatic hydrocarbons, and mixtures of at least two of these hydrocarbons.

* * * * *